United States Patent
Hong et al.

(10) Patent No.: US 10,814,754 B2
(45) Date of Patent: Oct. 27, 2020

(54) SEAT BACK FOR VEHICLE

(71) Applicants: Hyundai Motor Company, Seoul (KR); KIA Motors Corporation, Seoul (KR)

(72) Inventors: Suk Won Hong, Bucheon-si (KR); Gil Ju Kim, Seoul (KR); Seon Chae Na, Yongin-si (KR); Chan Ho Jung, Gunpo-si (KR); Jong Seok Han, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/395,583

(22) Filed: Apr. 26, 2019

(65) Prior Publication Data

US 2020/0180480 A1 Jun. 11, 2020

(30) Foreign Application Priority Data

Dec. 10, 2018 (KR) .......... 10-2018-0158178

(51) Int. Cl.
*B60N 2/66* (2006.01)
*B60N 2/68* (2006.01)
*B60N 2/90* (2018.01)

(52) U.S. Cl.
CPC .............. *B60N 2/667* (2015.04); *B60N 2/68* (2013.01); *B60N 2/99* (2018.02)

(58) Field of Classification Search
CPC ............. B60N 2/667; B60N 2/99; B60N 2/68
USPC ...................................... 297/284.9
See application file for complete search history.

(56) References Cited

U.S. PATENT DOCUMENTS 6,786,544 B1   9/2004   Muraishi

FOREIGN PATENT DOCUMENTS

| JP | 5118400 B2 | 1/2013 | |
| JP | 2018055469 A | 4/2018 | |
| KR | 20100074870 A * | 7/2010 | ............. B60N 2/986 |
| KR | 10-1046295 B1 | 7/2011 | |
| KR | 10-1640689 B1 | 7/2016 | |

* cited by examiner

*Primary Examiner* — Anthony D Barfield
(74) *Attorney, Agent, or Firm* — Brinks Gilson & Lione

(57) ABSTRACT

The present disclosure provides a seat back including a bolster for a vehicle. The seat back may include a seat back frame including a side member formed on each of opposite sides thereof so that a left-and-right support of the seat back may be automatically adjusted. The seat back further includes a rotating plate having a structure integrally including an external plate extending into the bolster, and an internal plate extending inwardly into the seat back. A boundary portion between the external plate and the internal plate of the rotating plate may be rotatably mounted to the side member of the seat back frame.

9 Claims, 6 Drawing Sheets

SEAT BACK FOR VEHICLE

CROSS-REFERENCE TO RELATED APPLICATION

This application claims priority to and the benefit of Korean Patent Application No. 10-2018-0158178, filed on Dec. 10, 2018, which is incorporated herein by reference in its entirety.

FIELD

The present disclosure relates to a seat back for supporting a body of an occupant in a vehicle.

BACKGROUND

The statements in this section merely provide background information related to the present disclosure and may not constitute prior art.

Generally, a seat for a vehicle may include a seat cushion configured to support the lower body including the hips of an occupant, a seat back configured to allow the occupant to lean his/her upper body thereon, and a headrest configured to support the head and the neck of the occupant.

The seat back may be provided with various seat back-related devices for convenience such as a reclining mechanism, a bolster expansion mechanism, and a lumbar support mechanism.

Furthermore, as a partial configuration of the seat back for safety of the occupant, bolsters respectively protrude from left and right sides of the seat back to support side parts of the upper body of the occupant and restrict the upper body from leaning to one side due to centrifugal force or the like when the vehicle turns.

However, we have discovered that the conventional seat back has the following disadvantages.

First, when an occupant with a large body type leans his/her upper body on the seat back, the upper body may be placed over the bolsters or tightly fitted between the bolsters. Hence, bolsters may make the occupant uncomfortable.

Second, when an occupant with a small body type leans his/her upper body on the seat back, the upper body of the occupant may be spaced too far apart from the bolsters. Thus, the bolsters may not properly support the side parts of the upper body of the occupant.

The above information disclosed in this Background section is only for enhancement of understanding of the background of the disclosure, and therefore it may contain information that does not form the prior art that is already known to a person of ordinary skill in the art.

SUMMARY

The present disclosure provides a seat back including a bolster for a vehicle which is configured such that, when an occupant with a large body type leans his/her upper body on the seat back, the bolsters spread outward, and when an occupant a small body type leans his/her upper body on the seat back, the bolsters contract inward. Accordingly, the seat back structure of the present disclosure makes it possible to provide seating comfort to an occupant regardless of his/her body type, and enhance the occupant support by the bolsters.

According to an exemplary form of the present disclosure, the seat back includes a seat back frame having a side member formed on each of opposite sides thereof, and a rotating plate having a structure integrally including an external plate extending into the bolster, and an internal plate extending inwardly into a seat back. In addition, a boundary portion between the external plate and the internal plate of the rotating plate is rotatably mounted to the side member.

According to a further aspect of the present disclosure, a hinge wire may be mounted to the side member, a hinge bracket having a hinge hole may be integrally formed on the boundary portion between the external plate and the internal plate, and the hinge wire may be inserted into the hinge hole to allow the rotating plate to rotate. The hinge hole may have a slot shape extending in a left-right direction to allow the rotating plate to move to left or right.

According to a further aspect of the present disclosure, the external plate and the internal plate may form a predetermined angle on the boundary portion, and the predetermined angle may be set to an angle between a surface of the seat back and the bolster.

According to a further aspect of the present disclosure, the internal plate of the rotating plate may be coupled to a suspension wire disposed in a lateral direction between the side members of the seat back frame. A wire insert body may be integrally provided on an inner end of the internal plate so that an end of the suspension wire is inserted into and coupled to the wire insert body.

According to a further aspect of the present disclosure, when a pressurizing force applied to the external plate of the rotating plate is greater than a pressurizing force applied to the internal plate, the external plate may rotate outward around the hinge wire inserted into the hinge hole so that the bolster performs a spread-out operation. During the spread-out operation of the bolster, the rotating plate may move outward, and the hinge wire may slide to an inner section of the hinge hole.

According to a further aspect of the present disclosure, when a pressurizing force applied to the internal plate is greater than a pressurizing force applied to the external plate, the external plate may rotate inward around the hinge wire inserted into the hinge hole so that the bolster performs an inward contraction operation. During the inward contraction operation of the bolster, the rotating plate may be moved inward by elastic restoring force of the suspension wire, and the hinge wire may slide to an outer section of the hinge hole.

Further areas of applicability will become apparent from the description provided herein. It should be understood that the description and specific examples are intended for purposes of illustration only and are not intended to limit the scope of the present disclosure

DRAWINGS

In order that the disclosure may be well understood, there will now be described various forms thereof, given by way of example, reference being made to the accompanying drawings, in which.

Figure 1:
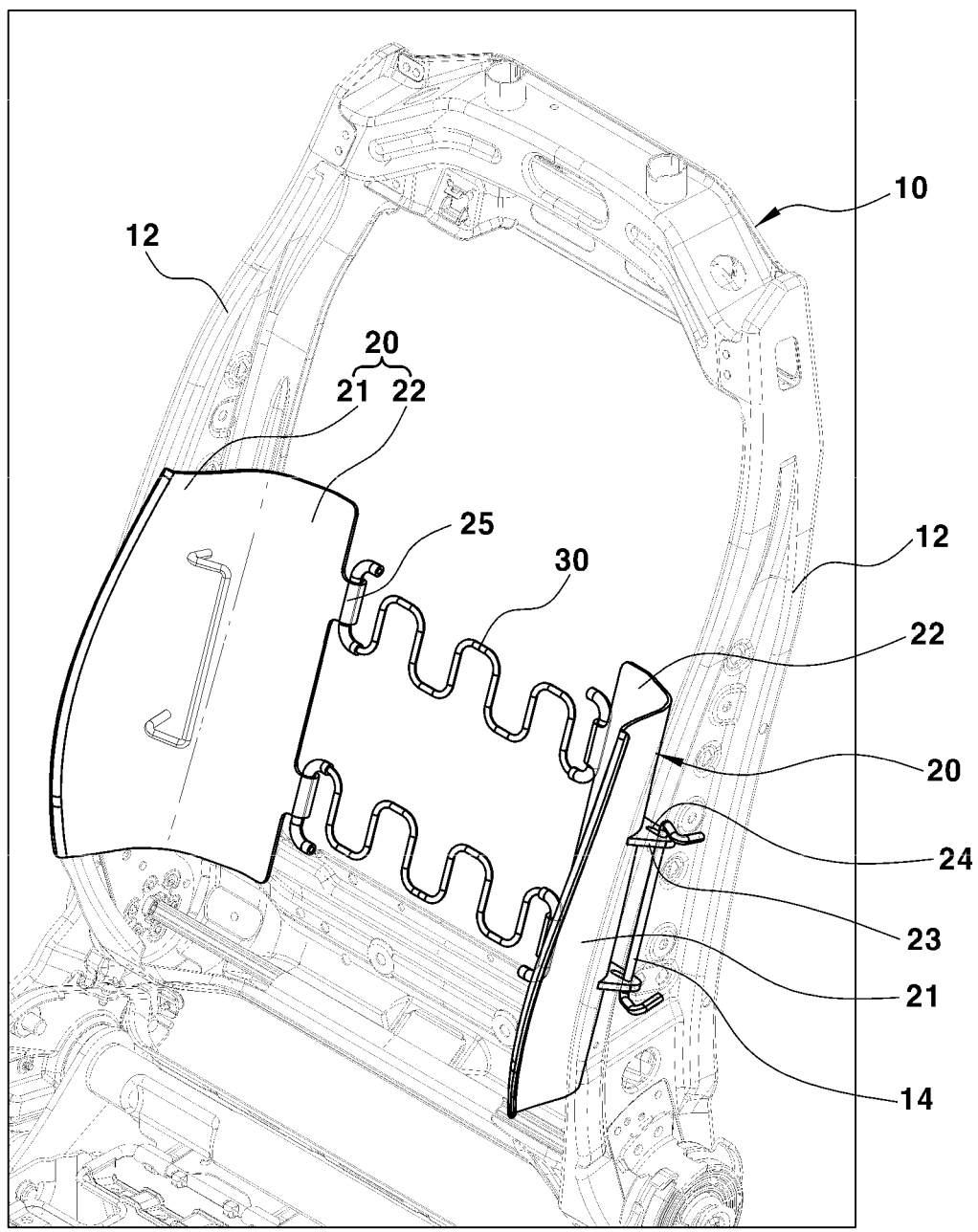
FIG. 1 is a perspective view illustrating a seat back for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
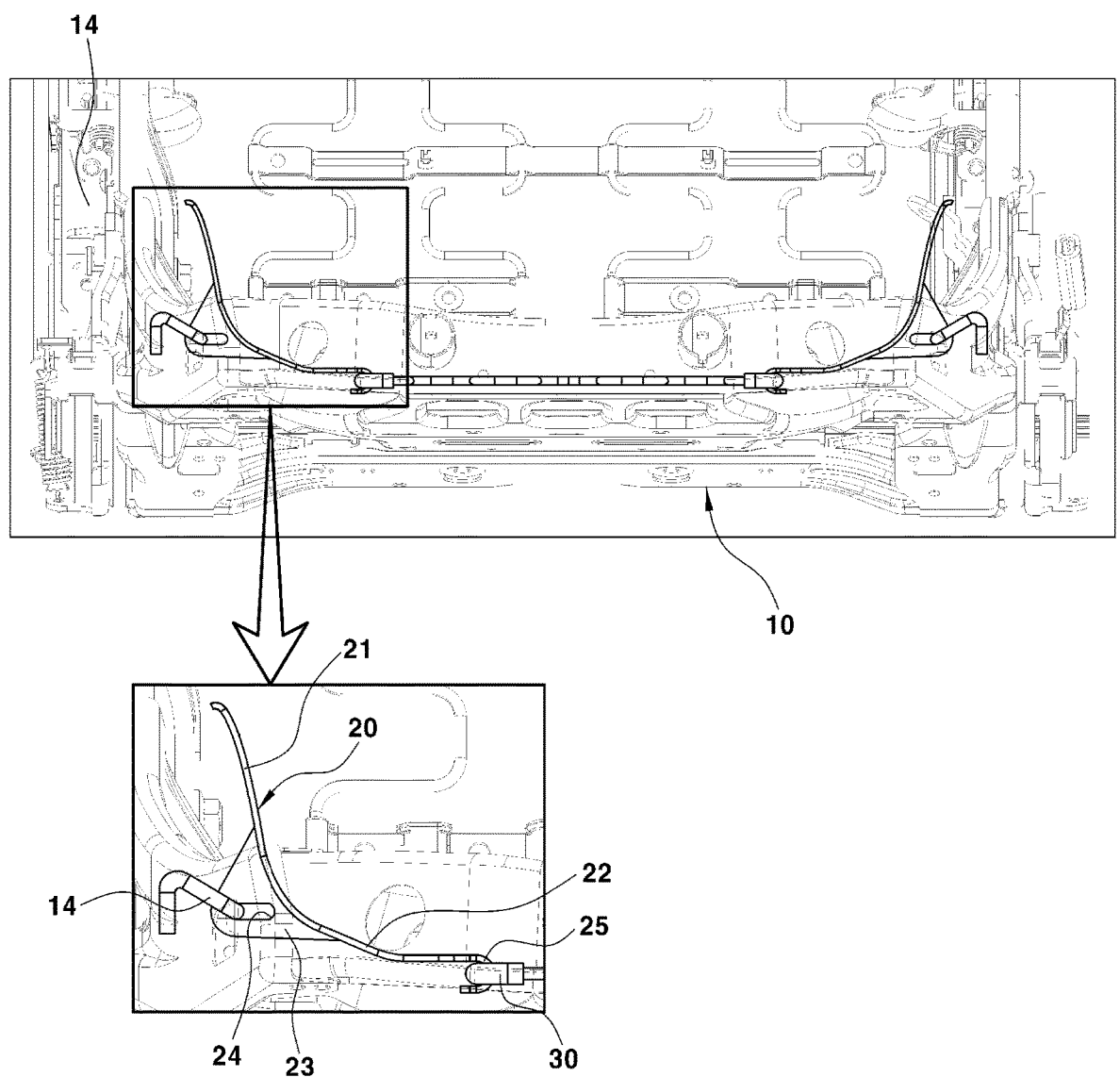
FIG. 2 is a sectional view illustrating a state in which a bolster of the seat back according to the present disclosure is disposed at a neutral position.

FIGS. 1 and 2 are respectively a perspective view and a sectional view illustrating a seat back for a vehicle according to an exemplary form of the present disclosure.

Figure 5:
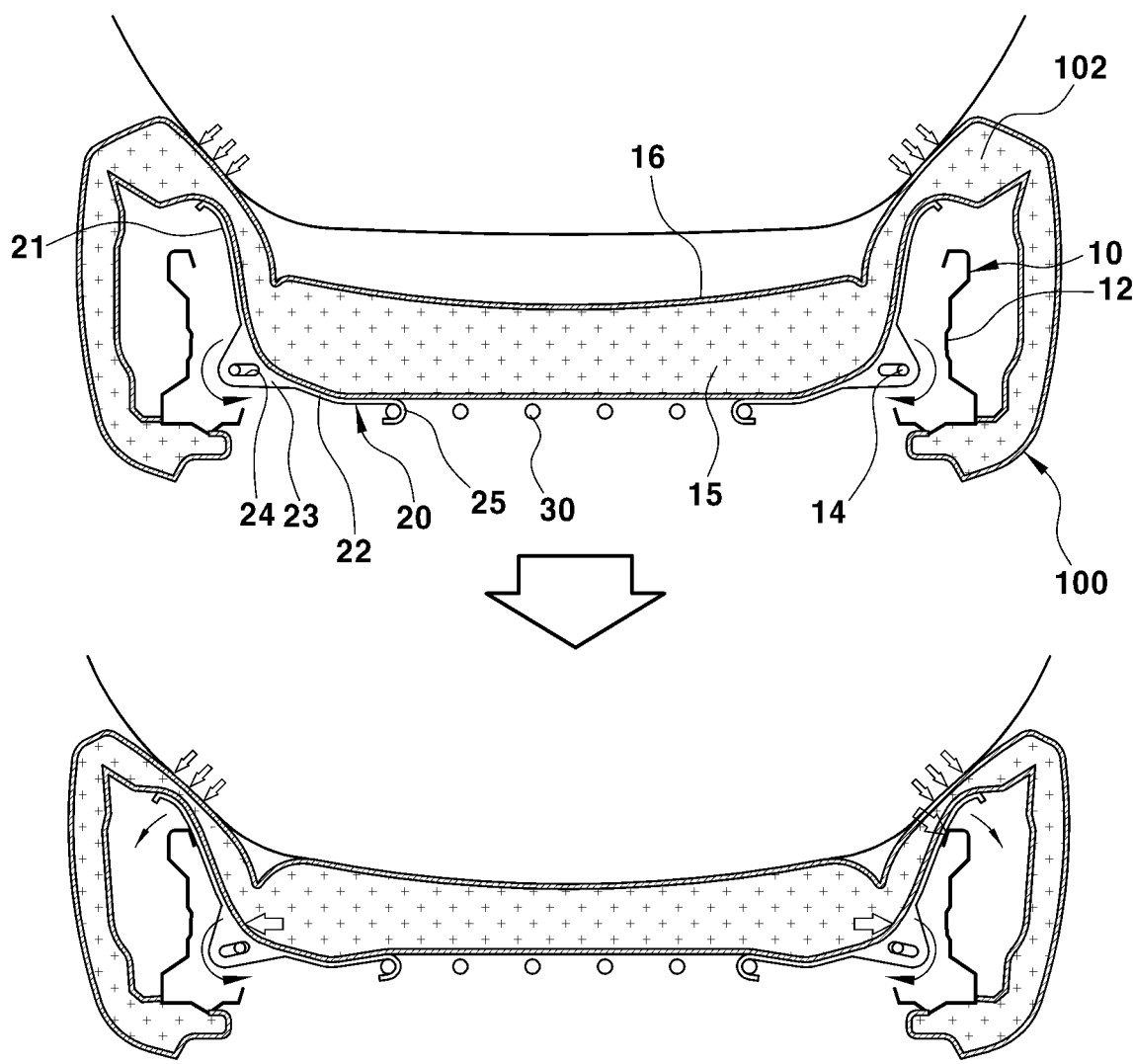
FIG. 5 is a sectional view illustrating an operation of spreading the bolster of the seat back according to the present disclosure outward by a large body type occupant.

In FIG. 1, a seat back frame 10 is a structure for forming an internal framework of the seat back 100 (see FIG. 5). Side members 12 each are integrally formed with opposite sides of the seat back frame 10 in an up-and-down direction.

A hinge wire 14 is fixed at a predetermined position in each of the side members 12 by welding or the like along the up-and-down direction. A rotating plate 20 is rotatably mounted to the hinge wire 14, respectively.

The rotating plate 20 has a structure integrally including an external plate 21 that extends into the corresponding bolster 102, and an internal plate 22 that extends inward in the seat back 100 (see FIG. 5).

Preferably, the external plate 21 and the internal plate 22 form a predetermined angle based on a boundary portion therebetween. The predetermined angle is set to an angle between a surface of the seat back 100 and the bolster 102 that is obliquely formed on each of the opposite side portions of the seat back 100 (see FIG. 5).

A hinge bracket 23 having a hinge hole 24 formed in the up-and-down direction is integrally provided on a rear surface of the boundary portion between the external plate 21 and the internal plate 22.

Preferably, as shown in FIG. 2, the hinge hole 24 formed in the hinge bracket 23 has a slot shape extending in a left-right direction (a lateral direction of the vehicle). Accordingly, the hinge hole 24 of the hinge bracket 23 allows the rotating plate 20 to move to the left or the right other than rotating, depending on the body type of an occupant who sits on the seat, as will be described below.

As shown in FIG. 1, the boundary portion between the external plate 21 and the internal plate 22 of the rotating plate 20 may be rotatably mounted to the corresponding side member 12. To this end, the hinge wire 14 fixed to the side member 12 is inserted into the hinge hole 24 so that the rotating plate 20 is rotatable on the hinge wire 14. Taking into account convenience in assembly, it is preferable that the hinge wire 14 be inserted into the hinge hole 24 of the hinge bracket 23 before being welded to the side member 12. The internal plate 22 of the rotating plate 20 is coupled to a suspension wire 30 disposed in a lateral direction between the side members 12 of the seat back frame 10. The suspension wire 30 is bent in a zigzag pattern to have elastic supporting force. Preferably, a wire insert body 25 having a hollow pipe shape is integrally provided on an inner end of the internal plate 22 so that an end of the suspension wire 30 is inserted into the wire insert body 25. Thereby, connection between the internal plate 22 and the suspension wire 30 may be facilitated.

Figure 6:
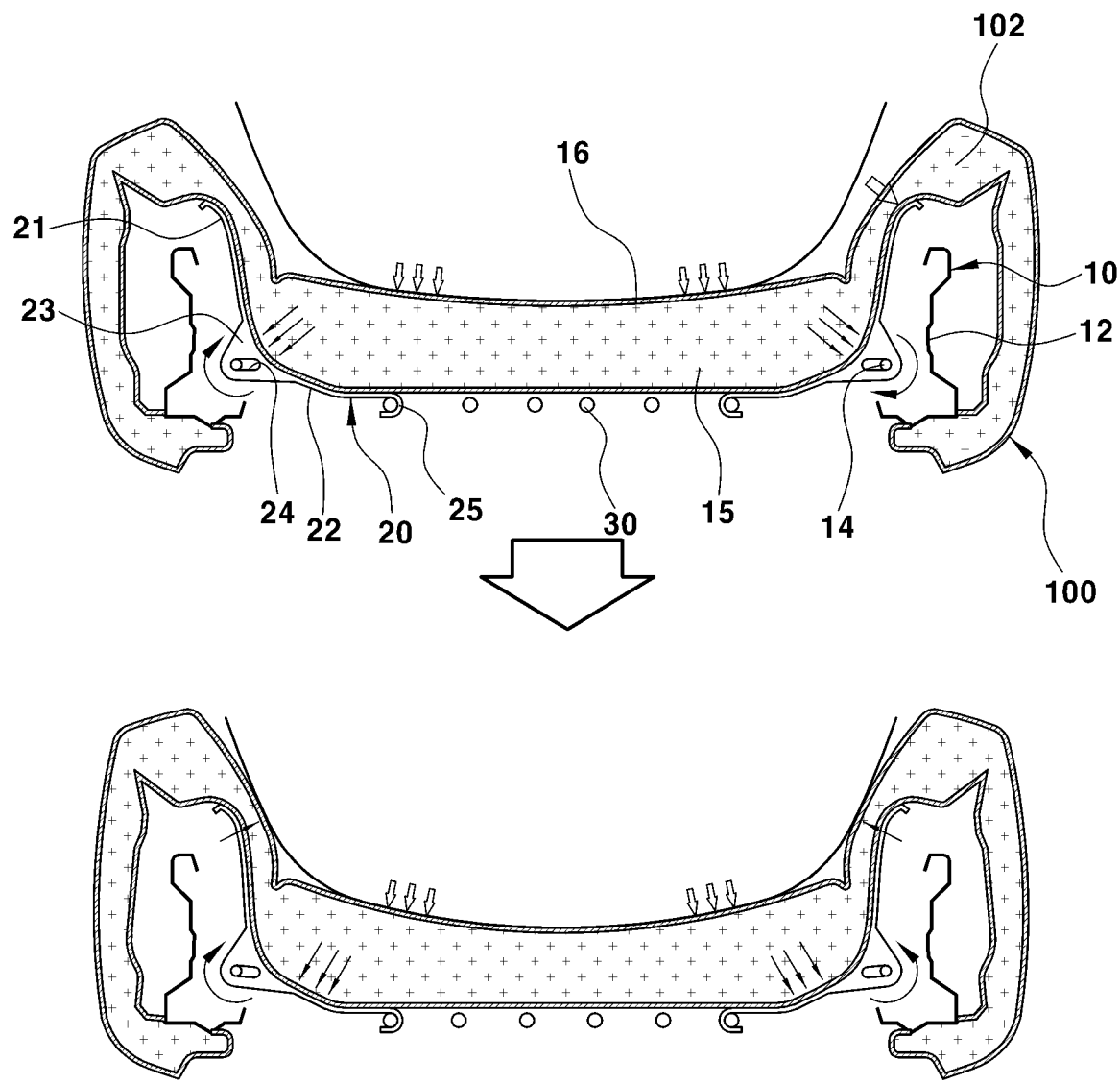
FIG. 6 is a sectional view illustrating an operation of contracting the bolster of the seat back according to the present disclosure by a small body type occupant.

As such, the rotating plates 20 are assembled with the respective side members 12 so as to be rotatable and movable to the left and the right in the lateral direction of the vehicle, and the internal plates 22 are coupled to the suspension wire 30. Thereafter, as shown in FIGS. 5 and 6, when a seat pad 15 and a seat cover 16 are assembled with the seat back frame 10, the external plate 21 of each of the rotating plates 20 is obliquely disposed in the corresponding bolster 102, and the internal plate 22 is disposed in the seat back 100.

Hereinafter, the operation of the seat back according to an exemplary form of the present disclosure having the above-mentioned configuration will be described.

FIG. 2 illustrates a state in which the bolster of the seat back according to the present disclosure is disposed in a neutral position.

When an occupant with a standard body type sits on the seat and leans his/her back on the seat back 100, body pressure is applied to both the seat back 100 and the bolsters 102. Thereby, the pressurizing force applied to each of the bolsters 102 by the body pressure is transmitted to the external plate 21 of the corresponding rotating plate 20 and, simultaneously, pressurizing force applied to the seat back 100 by the body pressure is transmitted to the internal plates 22 of the rotating plates 20.

When the pressurizing force applied to the seat back 100 by the body pressure and the pressurizing force applied to the bolsters 102 by the body pressure are almost the same as each other even if there may be a deviation therebetween, the pressurizing force transmitted to the external plate 21 and the pressurizing force transmitted to the internal plate 22 are maintained at almost the same level.

Therefore, in the case of the occupant with the standard body type, when the occupant leans his/her upper body on the seat back 100, both side portions of the upper body may be easily supported by the bolsters 102.

Figure 3:
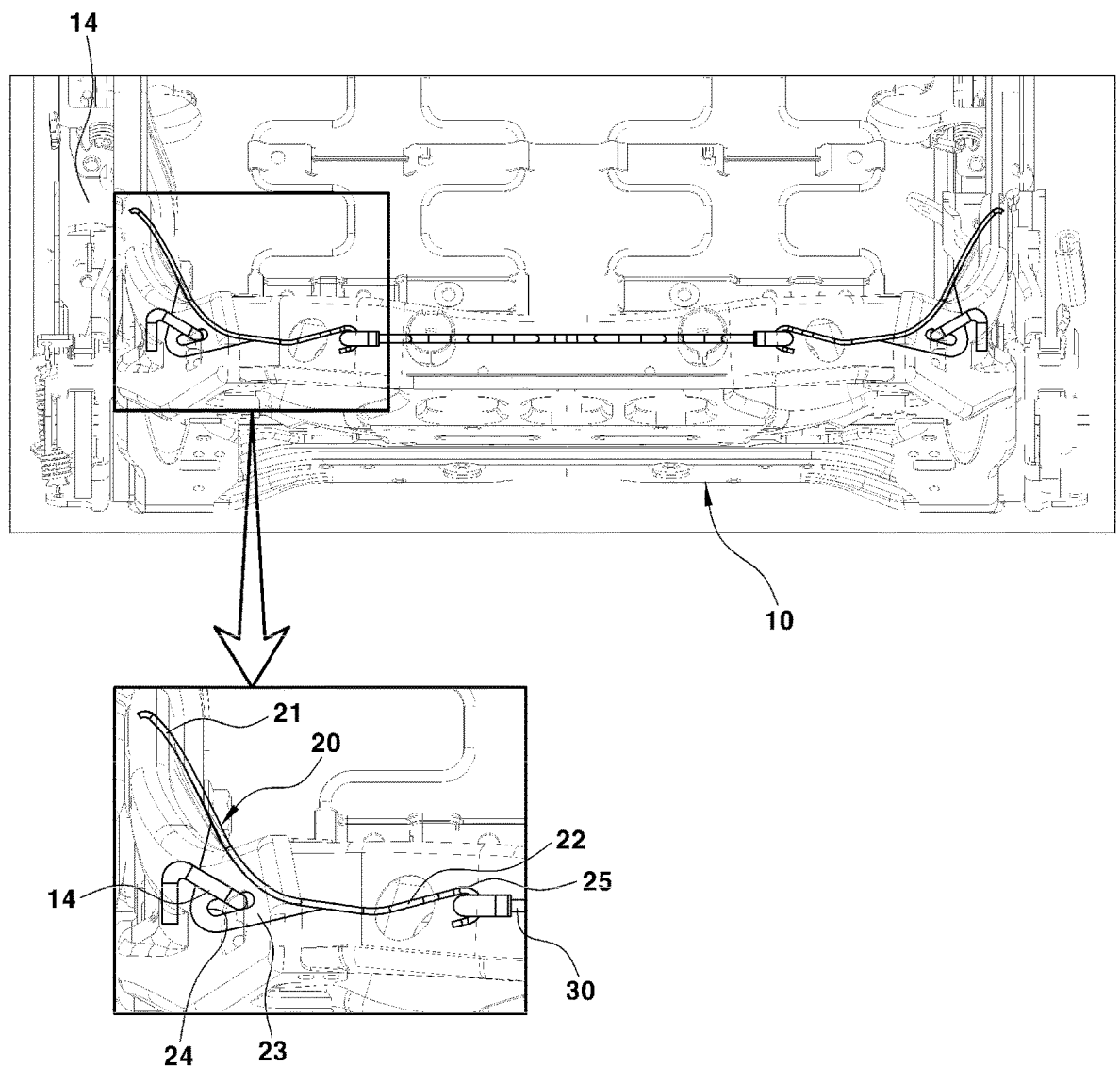
FIG. 3 is a sectional view illustrating a spread-out state of the bolster of the seat back according to the present disclosure.

FIGS. 3 and 5 illustrate a spread-out state of the bolster of the seat back according to an exemplary form of the present disclosure.

When an occupant with a large body type sits on the seat with the seat back 100, both side portions of the upper body of the occupant first come into contact with the bolsters 102, so that the body pressure is applied to the bolster 102 earlier than to the seat back 100. Thus, pressurizing force applied to the bolsters 102 by the body pressure is first transmitted to the external plates 21 of the rotating plates 20. Hence, each of the external plates 21 is rotated outward around the corresponding hinge wire 14.

Subsequently, when the upper body of the occupant comes into contact with the seat back 100 as well as the bolsters 102, pressurizing force applied to the seat back 100 by the body pressure is transmitted to the internal plates 22 of the rotating plates 20 while the pressurizing force applied to the bolsters 102 by the body pressure is transmitted to the external plates 21 of the rotating plates 20.

Therefore, the entire rotating plates 20 are moved laterally outward (from opposite sides of the seat back) by a predetermined distance along the slot shape of the hinge hole 24. The rotating plates 20 are allowed to move laterally outward by a predetermined distance along with the spread-out operation of the bolsters because the hinge hole 24 on the hinge bracket 23 is formed in each rotating plate 20 with the slot shape extending in the left-right direction (in the lateral direction of the vehicle).

In other words, when the rotating plate 20 moves laterally outward, the hinge wire 14 slides to an inner section of the hinge hole 24. Hence, the rotating plate 20 may easily move outward along with the spread-out operation of the bolster. The distance that the rotating plate 20 moves is limited to the slot length of the hinge hole 24 in the left-right direction. In addition, the suspension wire 30 coupled with the internal plates 22 is allowed to elastically support the upper body of the occupant.

As such, when the pressurizing pressure applied to the external plates 21 is greater than the pressurizing force applied to the internal plates 22, the external plates 21 rotate outward around the hinge wires 14. Subsequently, when the pressurizing force is simultaneously applied to the external plates 21 and the internal plates 22, the rotating plates 20 move laterally outward by a predetermined distance so that the bolsters 102 perform a spread-out operation. Therefore, when the occupant with a large body type sits on the seat in the vehicle, seating comfort and supporting force using the bolsters with the rotating plates 20 for the occupant may also be provided.

Figure 4:
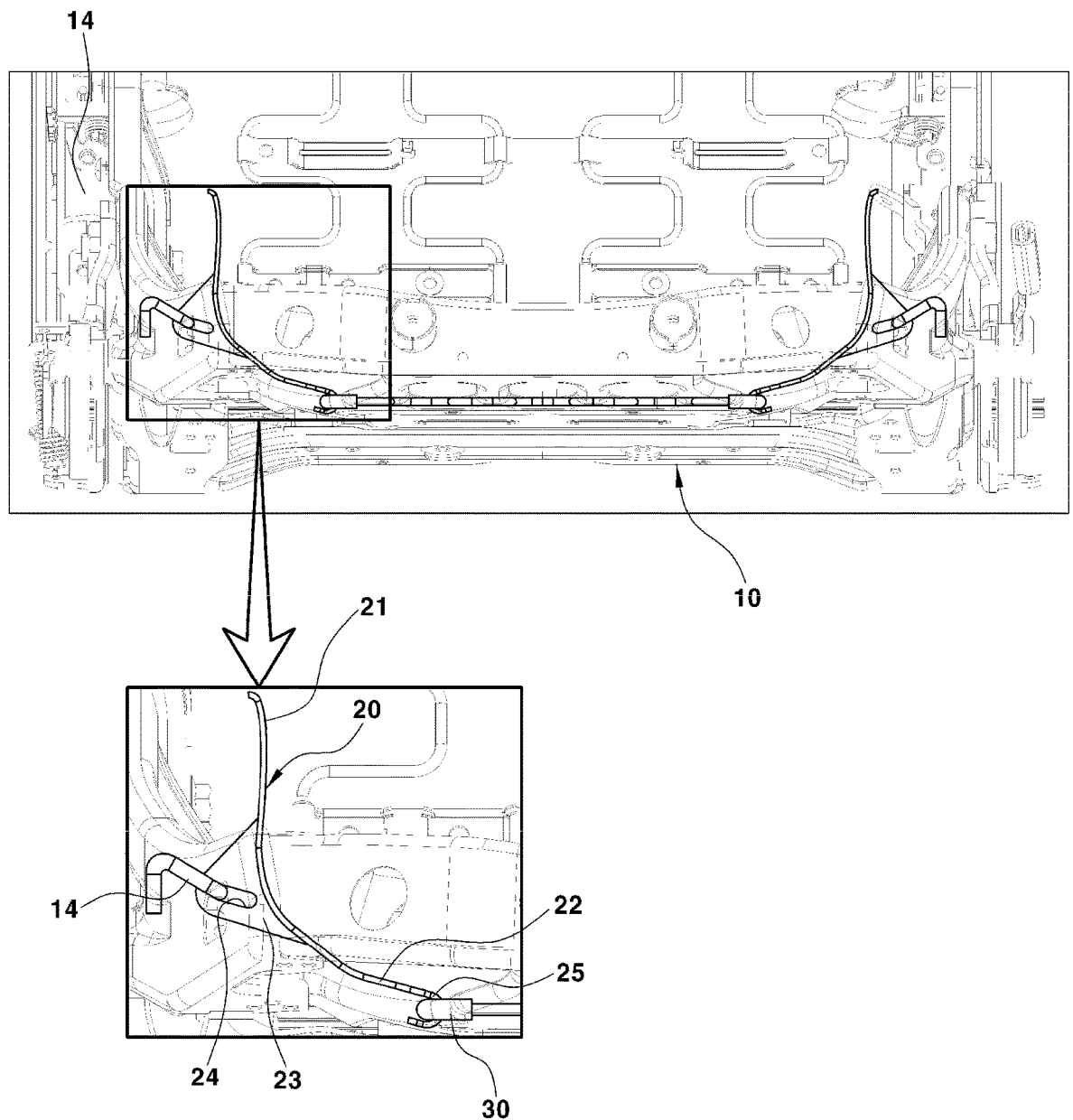
FIG. 4 is a sectional view illustrating a contracted state of the bolster of the seat back according to the present disclosure.

FIGS. 4 and 6 illustrate a contracted state of the bolster of the seat back according to an exemplary form of the present disclosure.

When an occupant with a small body type sits on the seat with the seat back 100, both side portions of the upper body of the occupant do not first come into contact with the bolsters 102. Instead, the back of the occupant first comes into contact with the seat back 100, so that the body pressure is applied to the seat back 100 earlier than to the bolsters 102.

Thus, the pressurizing force applied to the seat back 100 by the body pressure is first transmitted to the internal plates 22 of the rotating plates 20. The internal plates 22 rotate rearward around the hinge wires 14 and, simultaneously, the external plates 21 rotate inwardly. As the external plates 21 rotate inwardly, the bolsters 102 are inwardly contracted to enclose the side portions of the upper body of the occupant.

In addition, the suspension wire 30 pulls the internal plates 22 using the elastic restoring force thereof. Hence, when the external plates 21 rotate inwardly, the entire rotating plates 20 move inwardly by a predetermined distance.

As shown in FIG. 6, the rotating plates 20 are allowed to move inward by a predetermined distance along with the inward contraction operation of the bolsters because the hinge hole 24 is formed in each rotating plate 20 in a slot shape extending in a left-right direction (in a lateral direction of the vehicle).

In other words, when the rotating plate 20 moves inwardly, the hinge wire 14 slides to an outer section of the hinge hole 24 along the slot shape. Hence, the rotating plate 20 may easily move inward along with the inward contraction operation of the bolster. The distance that the rotating plate 20 moves is also limited to the slot length of the hinge hole 24 with respect to the left-right direction.

As such, when the pressurizing pressure applied to the internal plates 22 is greater than the pressurizing force applied to the external plates 21, the external plates 21 rotate inward around the hinge wires 14. Subsequently, the suspension wire 30 pulls the internal plates 22 using the elastic restoring force thereof so that the entire rotating plates 20 move inward as much as possible and the bolsters 102 perform an inward contraction operation. Therefore, when the occupant with a small body type sits on the seat in the vehicle, seating comfort and supporting force using the bolsters with the rotating plates 20 for the occupant may also be provided.

According to the present disclosure, when an occupant with a large body type leans his/her upper body on a seat back 100, the bolsters 102 spread outward, and when an occupant a small body type leans his/her upper body on the seat back 100, the bolsters 102 contract inward. Therefore, the present disclosure may provide seating comfort to an occupant regardless of his/her body type, and enhance the occupant support of the bolsters 102 with the installed rotating plates 20.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirt and scope of the present disclosure.

What is claimed is:

1. A seat back including a bolster for a vehicle, the seat back comprising:
   a seat back frame including a side member formed on each of opposite sides thereof; and
   a rotating plate having a structure integrally including an external plate extending into the bolster, and an internal plate extending inwardly into the seat back,
   wherein:
   the rotating plate is provided on each of the side members,
   a boundary portion formed between the external plate and the internal plate of each of the rotating plates is rotatably mounted to the side members, respectively,
   a suspension wire is disposed in a lateral direction between the side members of the seat back frame and configured to connect the internal plates of the rotating plates to each other.

2. The seat back of claim 1, wherein a hinge wire is respectively mounted to the side members, a hinge bracket having a hinge hole is respectively integrally formed on the boundary portions of the rotating plates, and the hinge wire is inserted into the hinge hole to allow the rotating plates to rotate.

3. The seat back of claim 2, wherein the hinge hole has a slot shape extending in a left-right direction to allow the rotating plates to move to left or right.

4. The seat back of claim 2, wherein, when a pressurizing force applied to at least one external plate of the external plates of the rotating plates is greater than a pressurizing force applied to at least one internal plate of the internal plates, the at least one external plate rotates outward around the hinge wire inserted into the hinge hole so that the bolster performs a spread-out operation.

5. The seat back of claim 4, wherein, during the spread-out operation of the bolster, the rotating plate moves outward, and the hinge wire slides to an inner section of the hinge hole.

6. The seat back of claim 2, wherein, when a pressurizing force applied to at least one internal plate of the internal plates is greater than a pressurizing force applied to at least one external plate of the external plates, the at least one external plate rotates inward around the hinge wire inserted into the hinge hole so that the bolster performs an inward contraction operation.

7. The seat back of claim 6, wherein, during the inward contraction operation of the bolster, the rotating plate is moved inward by elastic restoring force of the suspension wire, and the hinge wire slides to an outer section of the hinge hole.

8. The seat back of claim 1, wherein the external plate and the internal plate form a predetermined angle on the boundary portion, and the predetermined angle is set to an angle between a surface of the seat back and the bolster.

9. The seat back of claim 1, wherein a wire insert body is integrally provided on an inner end of each of the internal plates so that ends of the suspension wire is respectively inserted into and coupled to the wire insert bodies of the internal plates.

\* \* \* \* \*